M. DERBY.
Gate.
No. 218,001. Patented July 29, 1879.
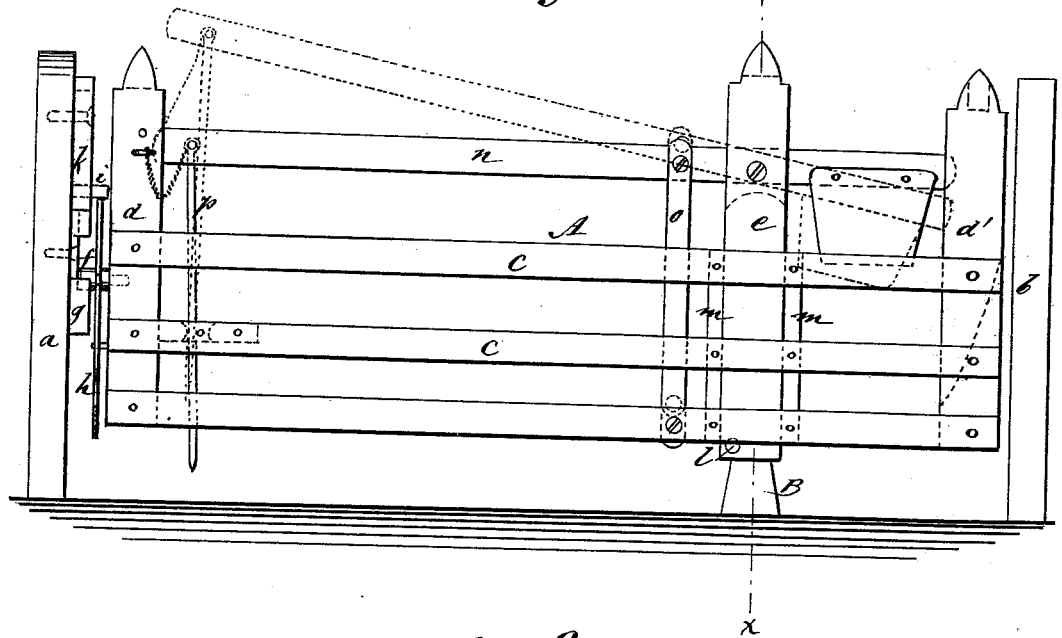
Fig. 1
Fig. 2
Fig. 3  Fig. 4  Fig. 5
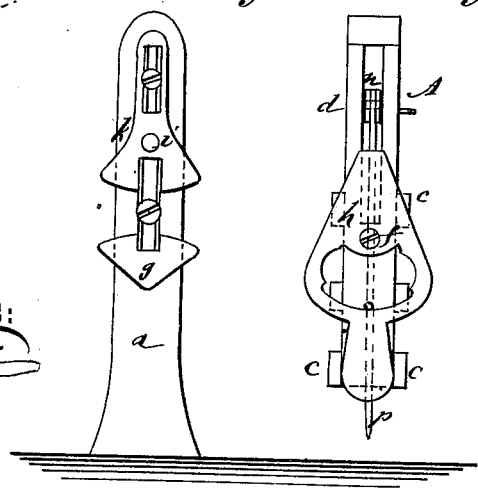
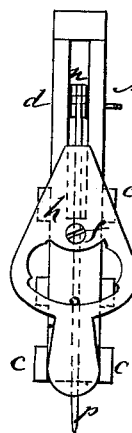
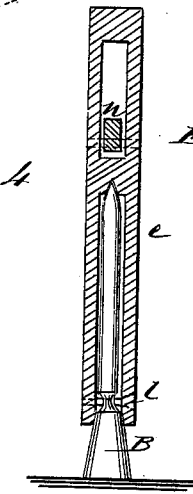
WITNESSES:
C. Neveux
C. Sedgwick
INVENTOR:
M. Derby
BY Munn &Co
ATTORNEYS.
N. PETERS, PHOTO-LITHOGRAPHER, WASHINGTON, D. C.

UNITED STATES PATENT OFFICE.

MOSES DERBY, OF PEPIN, WISCONSIN.

IMPROVEMENT IN GATES.

Specification forming part of Letters Patent No. 218,001, dated July 29, 1879; application filed June 10, 1879.

*To all whom it may concern:*

Be it known that I, MOSES DERBY, of Pepin, in the county of Pepin and State of Wisconsin, have invented a new and Improved Gate, of which the following is a specification.

My improvements relate to balanced swinging gates; and the invention consists in certain novel features of construction, whereby the gate is adapted for swinging in either direction, and may be raised to clear obstructions. These features, together with others, will be described more fully in connection with the accompanying drawings, wherein—

Figure 1 is a side elevation of a gate constructed in accordance with my invention. Fig. 2 is a top view of the same. Fig. 3 shows the fastening devices on the gate-post. Fig. 4 shows the fastenings used on the gate. Fig. 5 is a vertical cross-section on line $xx$ of Fig. 1.

Similar letters of reference indicate corresponding parts.

A is the gate, fitted to swing on a gate-post, B, between the fence-posts $a\,b$, as shown. The gate consists of horizontal rails $c$, attached to vertical end bars $d$, $d'$; but I do not limit myself in that particular.

The upper part of the gate-post B is formed as a spindle, adapted for entering the hollow vertical bar $e$, which sustains the gate; and the upper end of B is formed rounded or conical, to enter a correspondingly-shaped recess at the top of the aperture in $e$, so that the gate turns on the upper end of post B, and is also sustained sidewise. The bar $e$ is fitted in such position in the length of the gate that about one-quarter of the gate extends behind the gate-post B, and by making the bar $d'$ of heavy timber the gate will be balanced on the pivot of post B. This hanging also permits the gate to open in either direction.

The bar $e$ is prevented from rising on the post B by a pin, $l$, that is inserted through $e$, and engages with an annular groove in the post. The gate is hung to the bar $e$ by the devices next described, which permit raising of the gate to clear obstructions, such as snow and ice, without interfering with the proper operation of the gate on its pivot.

To the rails $c$, at the side of bar $e$, strips $m$ are attached, which strips, together with the rails $c$, retain the gate upon the bar, so that it may move only vertically. In the upper end of bar $e$ is fulcrumed a lever, $n$, that extends in the direction of the gate; and by a link, $o$, attached to lever $n$ and one rail, $c$, of the gate, the latter is hung on the lever, so that by raising and lowering the longer arm of the lever the gate is moved up or down on the bar $e$. The longer arm of lever $n$ extends to the end bar $d$ of the gate, and when depressed enters a groove in said bar and is held by a cross-pin. The shorter arm of lever $n$ extends behind the post B, and carries a weight, which assists in balancing the gate on its post.

I prefer to attach to the end of lever $n$, next to the end bar $d$, a metal rod, $p$, having its lower end sharpened for entering the ground when the lever is depressed, to retain the gate in any position more or less open.

The fastenings are attached at the longer end of the gate on the bar $d$ and fence-post $a$. These consist of a pin, $f$, fixed in the face of bar $d$, and a socket-plate, $g$, attached upon post $a$, which plate $g$ is formed with its upper edge inclined in both directions, so that the pin $f$ will move up the incline from either side, thereby raising the gate until the pin drops into the socket.

To prevent the gate from being unlatched by animals creeping beneath or by accident, a weighted arm, $h$, is hung loosely on pin $f$, and an adjustable plate, $k$, having a projecting lug, $i$, is attached on post $a$ above the upper end of the arm $h$. The arm $h$ is retained by gravity in a position where its upper end is caught by the lug $i$, so that the gate cannot be raised until the arm $h$ is moved to one side.

I do not limit myself to the described fastenings, as others may be substituted.

Having thus described my invention, I claim as new and desire to secure by Letters Patent—

1. The gate A, post B, hollow bar $e$, lever $n$, and link $o$, combined substantially as described and shown, as improved gate-hangings.

2. In combination with the gate A and post B, the vertical bar $e$, weighted lever $n$, and link $o$, substantially as described and shown, and for the purposes set forth.

3. The rod $p$, in combination with the gate A and its sustaining-lever $n$, substantially as and for the purposes set forth.

4. The weighted arm $h$, secured to the gate, in combination with the adjustable lug or projection $i$, attached to the latch-post, as and for the purposes set forth.

MOSES DERBY.

Witnesses:
A. D. GRAY,
E. Z. KLOETZ.